Jan. 24, 1961 R. J. HAZLETT 2,968,963
MOTOR DRIVEN AQUARIUM PUMP
Filed May 4, 1959
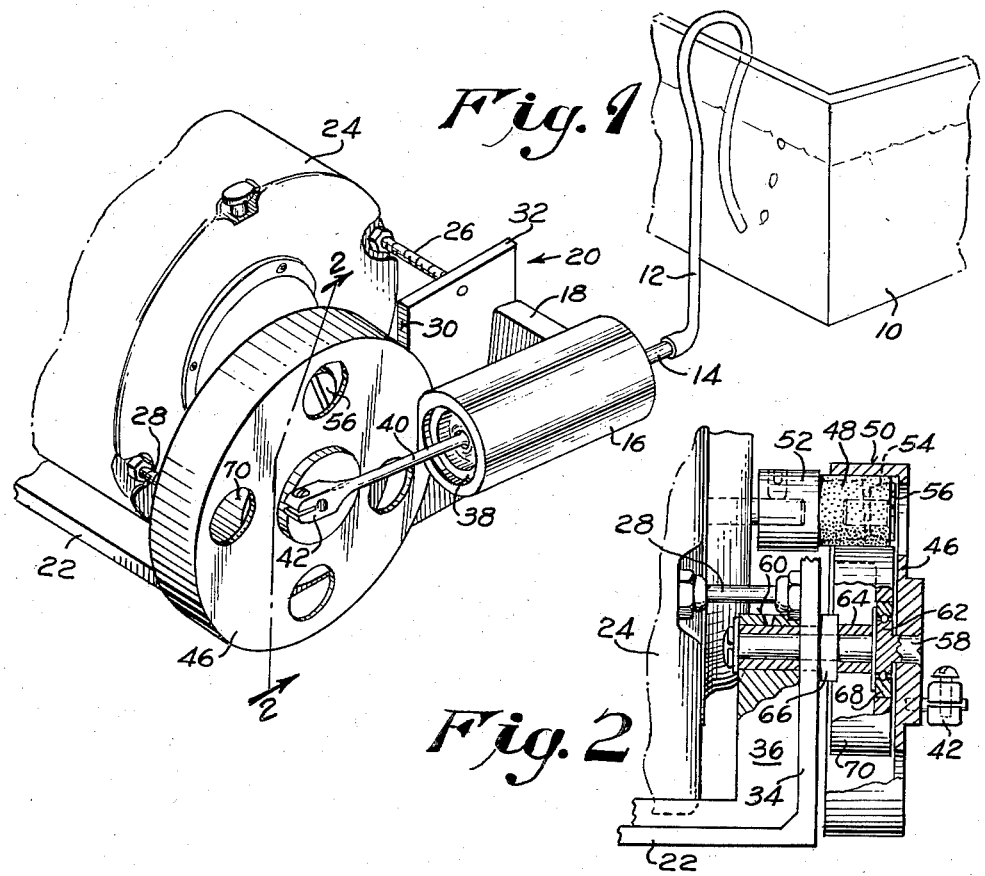
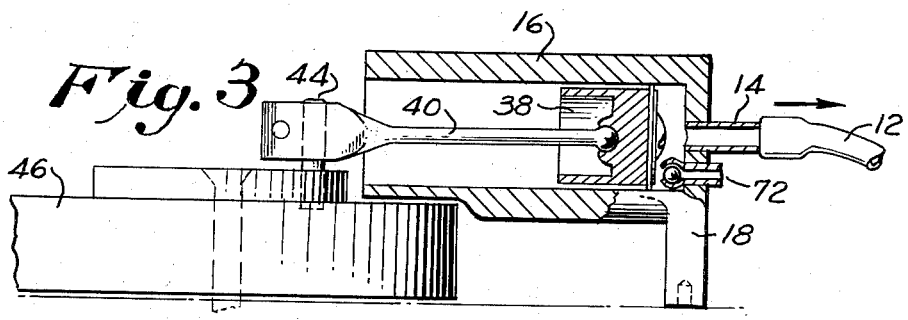
INVENTOR:
RUSSELL J. HAZLETT,
BY Homer R. Montague
ATTY.

United States Patent Office 2,968,963
Patented Jan. 24, 1961

2,968,963
MOTOR DRIVEN AQUARIUM PUMP

Russell Jennings Hazlett, 7802 Elmhurst, District Heights, Md.

Filed May 4, 1959, Ser. No. 810,917

4 Claims. (Cl. 74—206)

This invention is concerned with improvements in compact motor-and-pump units such as are employed for aeration of aquariums or the like, and it especially aims to provide a drive coupling between a small electric motor and a reciprocating piston pump, or other unbalanced load type of driven device, which will avoid serious faults in prior mechanisms of this general type.

Small electric motors of suitable design in other respects usually have a shaft speed which is far too fast for the direct drive of a crank or the like connected to a reciprocating load device. The desired speed reduction is easily accomplished by gearing, and where quiet operation is wanted, the gearing may be of frictional type. In any event, the unbalanced load represented by the piston rod or equivalent element imposes on the motor shaft and its bearing, and/or on the rotary element to which the crank is attached, a periodic lateral thrust which produces early bearing failure, play, slippage, noise, and generally poor efficiency. The present invention provides a unit of this type in which positive protection against these defects is afforded, by means which also operates to maintain good driving contact between the driving and driven elements of the speed-reducer.

In general, the objects of the invention are accomplished by means of a resilient drive puck or wheel on the motor shaft, which is engaged with an internal flange surface of a much larger driven wheel. The frictional engagement is obtained not merely by lateral pressure between these parts, but by reason of the fact that the drive puck is actually squeezed between the internal flange surface and an outer drive surface of an idler wheel which is concentric with the driven wheel of the friction gearing. The driven wheel and the idler are preferably mounted on a single bearing unit permitting them to rotate, as they must, in opposite directions. The driven crank is connected to an eccentric point at a suitable radius on the driven wheel in the usual way. The construction described permits the desired driving friction to be maintained without any net lateral thrust on the motor shaft or the bearing for the driven wheel, and also minimizes the effects of periodic and reversing application of the forces of reaction between the piston rod or crank arm and the said driven wheel of the frictional gearing. Finally, the invention provides a very simple and effective way of adjusting the driving friction, to allow for long-term wear of the surface of the drive puck, or changes in its resilience with age or atmospheric conditions.

The invention will best be understood by referring now to the following detailed specification of a preferred and exemplary embodiment thereof, taken in connection with the appended drawings, in which:

Figure 1 is a view in perspective of the construction as employed in an aquarium pump by way of example.

Figure 2 is a vertical sectional view, with parts broken away, taken generally along the line 2—2 of Figure 1.

Figure 3 is a bottom view of a portion of Figure 1, to a larger scale, and with the pump cylinder and piston shown partially in section.

As indicated in Figure 1 of the drawings, the device is embodied in a small motor driven reciprocating pump being employed to aerate the aquarium 10 by forcing air through a hose 12 in the usual manner. The hose is connected to the air outlet 14 of a conventional piston type pump whose cylinder 16 has an integral supporting leg 18 bolted to a vertical flange 20 of a mounting plate 22 which also supports the electric drive motor 24 as by threaded studs 26 and 28. The flange 20 is cut away as at 30 for compactness, and thus provides the portion 32 visible in Figure 1, and a second portion 34 seen in Figure 2. The mounting base is preferably of cast one-piece construction, and is ribbed as at 36 for greater strength and to provide an ample bearing for parts to be described.

The pump piston is shown at 38, and is driven by piston rod 40 which may have a ball and socket connection to the piston at one end, and a pivotal connection 42 to a crank pin 44 at the other end. The crank pin is secured, at a suitable radius considering the piston throw, to the driven wheel 46 of the frictional speed reducing gearing best shown in Figure 2 as comprising a frictional drive puck 48 engaging the inner concentric surface of the flange 50 of wheel 46. The drive puck constitutes the driving member of the pair of frictional gear elements, and may be formed as a rubber or like sleeve secured to a fitting 52 carried on the shaft of motor 24. A cone washer or the like 54 is preferably provided inside at least a portion of the frictional sleeve, and an adjusting screw 56 passes through the conical element and is threaded into the fitting 52, to adjust the effective diameter of the puck. The wheel 46 is apertured at one or more positions as shown in Figure 1, to allow the screw 56 to be adjusted as desired without disassembly of the parts.

Driven wheel 46 is affixed to a stub shaft 58 rotatably carried by the flange 34 at bearing 60, and held in axial position at its inboard end as by a washer and snap ring as shown in Figure 2. An inner bearing race 62, which may be integral with or pressed upon the shaft 58, limits axial shaft motion in the outward direction in cooperation with a washer, a spacer collar 64, and the surface of flange 34 or a boss 66 integral therewith. The outer race of the bearing, indicated at 68, is integral with or affixed to an idler wheel 70 which is thus concentrically mounted with respect to driven wheel 46 but is perfectly free to rotate independently thereof. Idler wheel 70 is sized so that its outer periphery defines, in cooperation with the inner surface of the flange 50, an annular groove whose width snugly receives the frictional element of drive puck 48. In this way, the frictional contact required to effect the drive is obtained not by mere lateral pressure on the puck, and hence on the motor bearing, but by equal and opposite contact pressures defined by the fit between the puck and the two surfaces which it contacts, the latter being always tangent at opposite ends of a diameter of the puck.

The resilient nature of the puck material thus permits all of the rotary parts to be pre-loaded as desired, in a symmetrical manner, and to a degree which completely eliminates the effects of differential side thrust due to the reciprocating motion of the piston rod. An extremely quiet and long wearing unit is thus obtained, and one which is low in cost, requires no maintenance, and is readily adjusted by the user.

Figure 3 details the interior pump construction. The piston 38 has the usual resilient or cup washer to fit the cylinder bore, and an inlet valve 72 which may be of simple gravity ball type. An outlet valve may be provided for outlet 14, but in the case of an aquarium pump is not required because of the flow resistance presented by the liquid in which the end of hose 12 will be immersed.

While the invention has been described in considerable detail so that those skilled in the art will understand it and be able to practice the same, it will be understood that various changes in such details can be made without departing from the scope of the invention as defined in the appended claims.

What is claimed is:

1. A motor-driven reduction gear drive for a reciprocating load such as a piston pump or the like, comprising a resilient cylindrical friction drive roll mounted on the shaft of a motor for rotation therewith, a driven wheel of substantially larger diameter than said roll and having a cylindrical flange providing an internal frictional contact surface engaged by said roll, a cylindrical idler wheel concentrically within said driven wheel and sized to provide, between its outer surface and the internal surface of said flange, an annular cylindrical space of width less than the normal uncompressed diameter of said roll, snugly receiving said roll, and a crank pin secured to said driven wheel to connect with said load.

2. A device in accordance with claim 1, in which said drive roll is of expandable construction, and including adjustable means for expanding said roll into pressure engagement with said flange and said idler wheel.

3. A device in accordance with claim 1, including means journalling said driven wheel on an axis fixed with respect to the axis of said drive roll, and anti-friction bearing means journalling said idler wheel on the axis of said driven wheel.

4. A device in accordance with claim 2, in which said adjustable means includes an adjusting screw at the free end of said drive roll to expand said roll, and in which said driven wheel is apertured to afford access to the head of said screw.

References Cited in the file of this patent

UNITED STATES PATENTS

| | | |
|---|---|---|
| 289,368 | Osborne | Nov. 27, 1893 |
| 570,052 | Price | Oct. 27, 1896 |
| 588,573 | Hartman et al. | Aug. 24, 1897 |
| 596,687 | Unger et al. | Jan. 4, 1898 |

FOREIGN PATENTS

| | | |
|---|---|---|
| 936 | Great Britain of 1898 | June 18, 1898 |